United States Patent
Fastabend et al.

(10) Patent No.: US 11,010,273 B2
(45) Date of Patent: May 18, 2021

(54) SOFTWARE CONDITION EVALUATION APPARATUS AND METHODS

(71) Applicant: Intel Corporation, Santa Clara, CA (US)

(72) Inventors: John R. Fastabend, Hillsboro, OR (US); Eric W. Multanen, Portland, OR (US); Patrick L. Connor, Beaverton, OR (US); Calin Gherghe, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 810 days.

(21) Appl. No.: 15/635,867

(22) Filed: Jun. 28, 2017

(65) Prior Publication Data

US 2019/0004929 A1 Jan. 3, 2019

(51) Int. Cl.
| | |
|---|---|
| *G06F 11/00* | (2006.01) |
| *G06F 11/36* | (2006.01) |
| *G06F 12/0897* | (2016.01) |
| *G06F 12/0875* | (2016.01) |
| *G06F 12/126* | (2016.01) |
| *G06F 11/30* | (2006.01) |

(Continued)

(52) U.S. Cl.
CPC ...... *G06F 11/3636* (2013.01); *G06F 11/0754* (2013.01); *G06F 11/302* (2013.01); *G06F 11/3055* (2013.01); *G06F 11/327* (2013.01); *G06F 11/3664* (2013.01); *G06F 12/0875* (2013.01); *G06F 12/0897* (2013.01); *G06F 12/126* (2013.01); *G06F 21/52* (2013.01); *G06F 2201/81* (2013.01); *G06F 2201/865* (2013.01); *G06F 2201/885* (2013.01); *G06F 2212/1016* (2013.01); *G06F 2212/1032* (2013.01); *G06F 2212/1041* (2013.01); *G06F 2212/452* (2013.01); *G06F 2212/502* (2013.01)

(58) Field of Classification Search
CPC .. G06F 11/302; G06F 11/3055; G06F 11/327; G06F 11/3636; G06F 11/3664; G06F 12/0875; G06F 12/0897; G06F 12/126; G06F 21/52
See application file for complete search history.

(56) References Cited

U.S. PATENT DOCUMENTS

| | | | |
|---|---|---|---|
| 6,182,022 B1 * | 1/2001 | Mayle | G06F 11/3409 702/182 |
| 6,658,600 B1 * | 12/2003 | Hogdal | G06F 11/3664 714/33 |

(Continued)

*Primary Examiner* — Joshua P Lottich
(74) *Attorney, Agent, or Firm* — Compass IP Law PC (57) ABSTRACT

Devices and methods for debugging software or detecting malicious software on a compute node are described herein. A device can include an interface to a central processing unit (CPU) of a compute node. The device can include processing circuitry. During execution of a software application of the CPU, the processing circuitry can process CPU operational metrics received over the interface, wherein values of the CPU operational metrics vary with execution of the software application. Based on the values, the processing circuitry can determine an operational status of the software application and provide an indicator of an error condition of the software application responsive to detection of an error based on any criteria. Other embodiments are also described.

22 Claims, 2 Drawing Sheets

(51) Int. Cl.
   *G06F 11/32* (2006.01)
   *G06F 21/52* (2013.01)
   *G06F 11/07* (2006.01)

(56) References Cited

U.S. PATENT DOCUMENTS

| | | | | |
|---|---|---|---|---|
| 7,627,784 | B1* | 12/2009 | Allen | G06F 11/3636 |
| | | | | 714/30 |
| 7,653,899 | B1* | 1/2010 | Lindahl | G06F 11/3636 |
| | | | | 717/128 |
| 9,268,670 | B1* | 2/2016 | Lachwani | H04L 43/50 |
| 10,031,815 | B2* | 7/2018 | Cohen | G06F 11/3055 |
| 2002/0199172 | A1* | 12/2002 | Bunnell | G06F 11/3636 |
| | | | | 717/128 |
| 2005/0183069 | A1* | 8/2005 | Cepulis | G06F 11/3636 |
| | | | | 717/128 |
| 2006/0259822 | A1* | 11/2006 | Swoboda | G06F 11/3636 |
| | | | | 714/38.13 |
| 2011/0267197 | A1* | 11/2011 | Archer | G06F 9/5094 |
| | | | | 340/584 |
| 2013/0198565 | A1* | 8/2013 | Mancoridis | G06F 21/554 |
| | | | | 714/26 |
| 2013/0283102 | A1* | 10/2013 | Krajec | G06F 11/3433 |
| | | | | 714/38.1 |
| 2015/0301861 | A1* | 10/2015 | LaChiusa | G06F 9/54 |
| | | | | 718/102 |
| 2015/0355992 | A1* | 12/2015 | Kolegayev | G06F 11/3024 |
| | | | | 718/104 |
| 2016/0275007 | A1* | 9/2016 | Matthews | G06F 11/2294 |
| 2016/0294800 | A1* | 10/2016 | Oppenheim, Jr. | G06F 16/2455 |
| 2017/0329690 | A1* | 11/2017 | Cudak | G06F 11/3452 |
| 2017/0344485 | A1* | 11/2017 | Chen | G06F 12/0875 |
| 2018/0074930 | A1* | 3/2018 | Avery | G06F 11/3433 |
| 2018/0157579 | A1* | 6/2018 | Rozenberg | G06F 9/4494 |
| 2018/0176095 | A1* | 6/2018 | Diwakar | H04L 41/5009 |
| 2018/0210803 | A1* | 7/2018 | Kobayashi | G06F 11/34 |
| 2018/0287902 | A1* | 10/2018 | Chitalia | G06F 11/327 |
| 2018/0288135 | A1* | 10/2018 | Narayan | G06F 11/3466 |
| 2018/0322033 | A1* | 11/2018 | Drzewiecki | G06F 11/3664 |

* cited by examiner

SOFTWARE CONDITION EVALUATION APPARATUS AND METHODS

TECHNICAL FIELD

Embodiments described generally herein relate to the field of computing, and in particular, to evaluation of software operational conditions and reliability.

BACKGROUND

Current methods for debugging software, optimizing software operation, and detecting the presence of malicious software cannot reliably collect low-level operating system data structures. Accordingly, the usefulness of current methods is limited because they may not offer an opportunity for operators to view and use desired information. Additionally, current methods can affect operations of a central processing unit (CPU) and therefore collected metrics may not accurately reflect the true state of the corresponding software and/or system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Monitoring and Debugging

Processor trace functionality can help operators and software- or hardware-based systems to monitor the operation of processor cores. Such monitoring can be useful for debugging and optimization of software. Processor trace functionality works by capturing information about software execution on each hardware thread using dedicated hardware facilities so that after software execution completes, the captured processor trace data can be reconstructed to determine program flow. The captured information can be collected in data packets, which can be buffered internally before being sent to a memory subsystem or otherwise used. An application programming interface (API), independent of any data viewer or data source, can be used to publish the captured information in a uniform way.

Performance profilers can use processor traces to discover the root causes of performance issues that affect the quality of software execution. For example, using processor tracing, video application developers can obtain details on the execution of problematic processing for individual frames. Processor traces also enable a deeper view into software execution. For example, processor traces can enable an examination of loop behavior, including loop counts, and loop entry and exit criteria.

Debuggers can use processor traces to reconstruct the code flow that led to a given location in the code. The given location can be a point of a software crash, a breakpoint, or a watchpoint, among other possibilities. Processor traces can be used to navigate recorded execution history via reverse stepping commands. Processor traces can also be used to debug stack corruptions. When the call stack has been corrupted, normal frame unwinding usually fails or may not produce reliable results. Processor traces can reconstruct the stack back trace based on low-level function calls (e.g., CALL and RET).

However, current processor trace functionality can add execution overhead, thereby changing the operation of the software that the processor trace was intended to monitor. Further, current processor trace functionality may not be able to provide or transmit the content of the low-level instruction cache or data cache of the CPU/s being monitored. Accordingly, the usefulness of these current methods is limited because they may not offer an opportunity for operators to view and use available information. Additionally, current processor trace functionality can affect operations of a central processing unit (CPU) and therefore collected metrics may not accurately reflect the true state of the system. This is at least in part because current processor trace hardware is collocated with the CPUs being monitored.

Embodiments address these and other issues by providing an interface (e.g., interface 200 (FIG. 2) between a Management Controller (MC), such as an Intel® Management Engine (ME) or Innovation Engine (IE) or other controller engine and the CPU or group of CPUs being monitored. The MC operates independently of the CPU or group of CPU being monitored. The MC (such as an ME) may be a dedicated microcontroller that provides various security and operational components. For example, some aspects of the MC may include, but are not limited to providing remote configuration, booting from a remote hard drive, using one-time passwords for two-factor authentication, and enabling a poison pill that may be used to disable or wipe a remote system over a 3G, 4G, 5G (or other wireless) connection.

The MC (such as an IE) may be a dedicated microcontroller that may act in concert with an ME type microcontroller and provide extensibility to the ME type microcontroller. Such IE type microcontroller may be used to execute Original Equipment Manufacturer (OEM)-provided firmware. OEMs (e.g., system builders) are able to provide their own unique, differentiating firmware for server, storage, and networking markets via the IE microcontroller. The MC having IE/ME type microcontrollers may be part of a chip set of a compute node including the CPU but separate from the CPU. Embodiments can also be implemented on a field programmable gate array (FPGA), which may be located within (e.g., electrically coupled to) a separate socket of the compute node from the CPU.

In accordance with various embodiments low level CPU level one (L1), level two (L2), level three (L3), and so forth, instruction/data cache info can be pushed by the corresponding CPU over an interface (e.g., interface 200 (FIG. 2)). In some examples, the corresponding CPU can push this or other data by executing code (e.g., firmware, software, microcode, etc.) that detects presence of the interface and that accesses a register/s (e.g., a model specific register (MSR)) of the CPU that includes the instruction/data cache information. The data from the register/s can then be provided to the interface through execution of the same or other code. The register/s can be locked or otherwise tagged as unavailable to other code or computer programs that are executing normally (e.g., not in an error condition). This locking can be implemented by CPU firmware or microcode, or the register/s can be hard-coded as enabled or disabled under specific conditions so that firmware modifications are not needed. Additionally or alternatively, a policy (e.g., access control) can be defined that manages access to the register/s. The policy can be managed by the IE/ME or other device.

A data cache is used by a CPU to reduce the average time to access data from the main memory. If needed data is not found in an L1 cache, the CPU can attempt to get the data from the L2 cache, and so on down to L3 and level four (L4) caches (if present). Information regarding L1, L2 and L3 cache usage, therefore, can help operators determine whether applications executing on the CPU are operating effectively and using memory efficiently. Instruction caches can help reduce the disparity of operational speeds between higher speed processors and slower access times of instruction memories. The instructions of a program are grouped into lines of instructions that are prefetched into an instruction cache. The processor references and executes instructions in accordance with the program counter, which identifies the particular instruction to be executed. Referenced instructions are transferred from the instruction cache to the processor for execution. When the instruction cache has available space due to the execution of lines of instructions by the processor, additional lines of instructions are fetched into the instruction cache from the program memory during the next available bus cycle. Information regarding the instruction cache, including available space in the instruction cache, and failure to find instructions m the instruction cache, can indicate reduced efficiency or other issues.

Embodiments are not limited to push mechanisms, and the MC (with IE/ME type microcontrollers) or FPGA can instead use direct memory access (DMA) protocols to access low level CPU L1, L2, or L3 instruction/data cache info over an interface (e.g., interface 200 (FIG. 2)). Accordingly, a debugging environment outside the main CPU can provide a "replay" of the main CPU operation and execution when components of the debugging environment detect CPU hang/stall, after a hard system crash, or other problem to be debugged. In some embodiments, DMA-type mechanisms can be utilized when the MC or FPGA detects an error condition, or in debugging embodiments. Push mechanisms may be used for malware detection embodiments described later herein. By thus limiting CPU involvement in debugging, and in malware detection, improvements in system speed and overall system operation can be realized.

Additionally, in some failure cases, it is either impossible or not advisable to interrupt the operation of a CPU. Some such failure cases include when a CPU hangs with interrupts masked, when the CPU is in a tight busy loop, etc. Embodiments provide an off-CPU system that can monitor CPU and memory and provide debug information at time of failure without relying on CPU interrupts.

Devices in accordance with various embodiments can maintain and/or store a system trace (e.g., a log or other organized collection of information) of CPU performance (relative or absolute), parameters regarding operational characteristics of an instruction/data cache (e.g., cache usage), operating system data structure content, memory accesses and other operational metrics, etc. of the CPU at runtime, with little or no overhead that can affect CPU operations. Subsequent to detection of a failure, embodiments can use the trace data to reconstruct the failure case. In this sense, the operation of various embodiments are similar to capturing a Peripheral Component Interconnect Express (PCIe) trace, reviewing the trace, and replaying the trace, or to capturing a wire trace and replaying the trace to reproduce and reconstruct bugs. However, both of those techniques only work on a small subset of software bugs. For example, PCIe tracing can only be used with PCIe-based peripherals for detecting driver bugs commonly related to operation system (OS) hardware misconfiguration, and to hardware bugs. PCIe tracing cannot provide introspection into software execution on the CPU. In contrast, embodiments can provide trace reviewing, replaying, etc. that are operable for detecting additional types of software bugs by using MC, FPGAs or other controller engines to provide failure recovery at the level of the CPU/host layer.

Further embodiments can provide a rollback/replay capability in which the off-CPU device rolls back CPU state and memory based on trace data and attempts to recover from a failed system condition without human intervention. Such rollback capability can be helpful when failures are transient, in other words, transient faults are often not reproducible and cannot be traced, so a rollback after the fault occurred may be the only way to determine the cause of the transient fault, and/or continue operation from the location of the initial failure.

Embodiments can further provide optimization by monitoring system patterns to identify common control flow and inform the CPU with "hints" on best paths (e.g., paths that historically have not included system failures, or paths that result in better cache usage or memory conditions), etc. transparently. A more informed optimizer could be increasingly involved in networking. For example, a more informed optimizer (e.g., with access to trace information and communication with the MC or FPGA) could identify common packet types, common hash algorithms, or other parameters to pin them in cache (e.g., by forcing the instruction cache or the data cache to never evict code or data from the L3 cache) or to optimize key generation, to push certain patterns into hardware offload engines, etc.

Signatures and Detection of Malicious or Malfunctioning Software

Transient or permanent faults introduced in a computer system during runtime can cause an incorrect sequence of instruction execution in software applications, causing control flow errors. Signature monitoring can detect such control flow errors. Signature monitoring can include first generating a signature associated with a block of instructions of a software application. The signature can be saved during compilation of the software application, and then the generated when the software application executes. The MC or FPGA described earlier herein (or other device or controller engine) can retrieve the saved signature from memory and compare the signature generated during execution of the software application to determine whether there are control flow errors. Additionally, signatures can be matched to previously-stored signatures to detect the presence of malicious software (e. "malware," or "bad" software) or to detect non-optimized or badly-performing software, or to provide an indication, such as a probability indicator that the software application includes malicious software.

Signatures can be assigned arbitrarily or derived from the binary code or the address of the instructions, or based on L1/L2/L3 cache information or other information described earlier herein. Algorithms for assigning signatures can include algorithms implementing Structural Integrity Checking, Control Flow Checking by Software Signatures, or other algorithms. Algorithms for deriving signatures can include algorithms based on Path Signature Analysis, Signatured Instruction Streams, Asynchronous Signatured Instructions Streams, Continuous Signature Monitoring, extended-precision checksum methods, and On-line Signature Learning and Checking, among other algorithms. Signatures can be monitored using dedicated hardware (e.g., watchdog processors) or using software methods. Some software methods for monitoring signatures can include or make use of assertions, watchdog tasks, Block Signature Self-Checking, Error Capturing Instructions, timers to check software behavior, Available Resource-driven Control-flow monitoring, and temporal redundancy methods.

Accordingly, the MC, FPGA, or other circuitry (e.g., processing circuitry 202 (FIG. 2) or engines described herein can: generate signatures using one of the above algorithms, or retrieve signatures generated by other systems; compare stored signatures to runtime signatures to detect (the presence of) malware perhaps based on comparison of signatures to a signature database of known malware or to detect non-optimized or badly-performing software in various embodiments.

Example Systems and Devices

As mentioned earlier herein, although some embodiments make use of MC with one or more ME/W-like elements, other implementations are possible in various other embodiments that use field-programmable gate arrays (FPGAs). Embodiments provide the capability for Intel® IE-like, Intel® ME-like, FPGAs or other deployments, platforms and software to debug software or detect malicious code executing on a CPU without disrupting CPU operations. Some embodiments can also be used to detect malicious code or malfunctioning code executing on a CPU without disrupting CPU operations.

Figure 1:
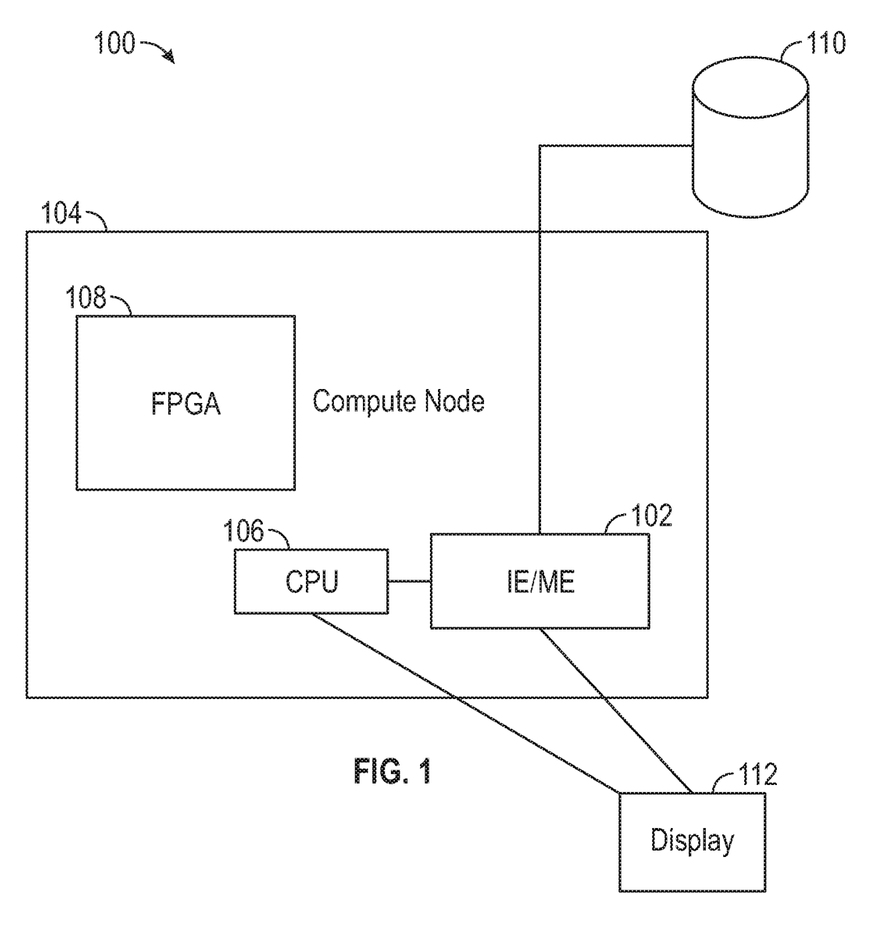
FIG. 1 illustrates components of a system in which methods for debugging software, optimizing software, and detecting malicious code can be performed in accordance with some embodiments.

FIG. 1 illustrates components of a system 100 in which methods for debugging software, optimizing software, and/or detecting malicious code can be performed in accordance with some embodiments. The system 100 may include a device 102 that can provide such debugging, optimizing and detecting. For example, the device 102 can include an MC (e.g., an IE/ME). Additionally or alternatively, an FPGA 108 can provide such debugging. The device 102 communicates with a CPU 106 of the compute node 104 over a signal interface, e.g., CPU interface 200 (FIG. 2) that may provide signal adjustment, data buffering, and/or other functions. The compute node 104 may include one or more CPUs 106 on which are executed various software applications to be debugged, optimized etc., by the device 102, or on which the device 102 will monitor for presence of malicious code execution. The system 100 can also include a remote or local database 110 for storage of information captured by the device 102 or FPGA 108, among other information. The system 100 can include a display 112 for display of information to a user/operator. While the system 100 is depicted as including one device 102, compute node 104 and CPU 106, it will be appreciated that the system 100 can include several compute nodes 104, each of which can include one or more CPUs 106 and devices 102.

Figure 2:
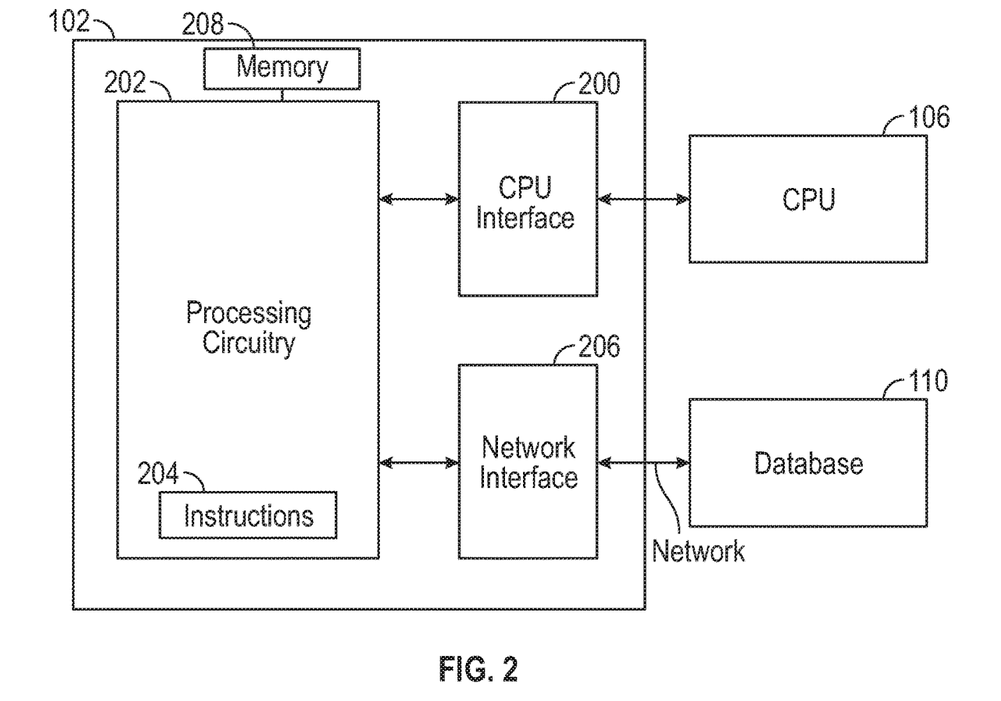
FIG. 2 illustrates a device including logic for debugging software, optimizing software, and detecting malicious code in accordance with some embodiments.

FIG. 2 illustrates the device 102 including debugging logic for providing off-CPU debugging, optimization, and monitoring in accordance with some embodiments. As described earlier herein, the device 102 can include an MC, or the device can include an FPGA, among other possible devices and engine types.

The device 102 may include at least one CPU interface 200 to a CPU 106. The interface (e.g., interface 200 (FIG. 2)) can include a peripheral interface, or the like. The interface (e.g., interface 200 (FIG. 2)) can include a physical bus (e.g., a set of conductors) between the CPU 106 and the device 102. This bus can connect various components of the CPU (e.g., instruction caches or other memory/ies, execution engine/s, etc.) to the device 102.

A peripheral interface is an interface over which information can be provided to/from the CPU to another device, such as through an operating system or through direct access to memory/caches (e.g., direct memory access (DMA)). Direct access to memory/cache data provides faster access to the data than access through the CPU. Peripheral interfaces include hardware and can operate a driver. Some interfaces provide data to devices internal to the same package or device as the CPU and some provide data external to the same package or device as the CPU. Some common external interfaces include Ethernet, Firewire, Universal Serial Bus, etc. Some internal interfaces for data communication include industry standard architecture (ISA), extended ISA, peripheral component interface (PCI), and the like. Some DMA interfaces include ISA, PCI, I/O acceleration technology I/OAT, AMBA high performance bus (AHB), or the like.

Burden can be reduced on the CPU 106 in embodiments, relative to current systems, in that rather than cache events, etc., being pushed to the CPU for processing or use in debugging, the interface 200 provides information on events, etc., to the device 102. The information can be provided using any protocol (e.g., a packet-based processor trace protocol, a peripheral interface protocol, or the like, such as can operate through a device driver). The interface 200 can couple to the CPU at points that would allow the interface 200 to detect instruction cache information and memory cache information, (e.g., between caches, memory, and other connections over which data is provided to/from the caches and memory).

The at least one CPU interface 200 can obtain low-level CPU 106 details and measurements when the CPU 106 pushes low-level details and measurements onto the CPU interface 200 using code (e.g., firmware or software) or when the CPU 106 responds to a pull request from the CPU interface 200. For example, the CPU interface 200 can be used to receive CPU 106 operational metrics during execution of a software application of the CPU 106, where values of the CPU 106 operational metrics vary with execution of the software application. These details and measurements, among other data, can be passed to the processing circuitry 202. These low-level CPU details and measurements can include L1, L2 and L3 cache usage. The processing circuitry 202 can then determine an operational status of the software application based on the CPU 106 operational metrics and any other low-level CPU details. The details and measurements, and other information, can be stored in the memory 208. The processing circuitry 202 can process CPU 106 operational metrics and any other low-level CPU details in or near real time (e.g., concurrently with execution of the software program, to determine operational status of the software application) in some embodiments. In other embodiments, the processing circuitry 202 can collect CPU 106 operational metrics and any other low-level CPU details for later processing to determine operational status of the software application.

Other details and measurements can include the instruction cache and PCIe bus details, as well as low-level operating system data structures (e.g., memory usage and memory allocator structures). By operating outside the CPU 106 therefore, the device 102 will reduce interference with the measurement being taken to substantially non-interference. For example, by not using memory of the CPU 106, the device 102 will not affect memory-based measurements. Bus details (e.g., PCIe Bus operational details) can be examined to detect unusual usage, which may indicate presence of malicious software or of a defect in an application executing on the CPU 106.

Storage data (e.g., network attached storage data) can be collected and stored and additionally distributed by the device 102 or by other devices or circuitry to create a unified database (e.g., database 110) of runtime signatures and profiles for applications. This data or other data can be provided by the network interface 206. For example, signatures can include various fields or parameters such as an instruction cache, cache usage, stack status, CPU utilization, etc., which describes an application during application operation. Data and measurements captured by the device 102 can be used to detect patterns and signatures of possible malicious code or malfunctioning code. Signatures and other data and measurements can be used to detect performance of applications and to perform code optimization of applications running on the CPU. The network interface 206 can communicate to a remote storage, for example the database 110.

Example Methods

Figure 3:
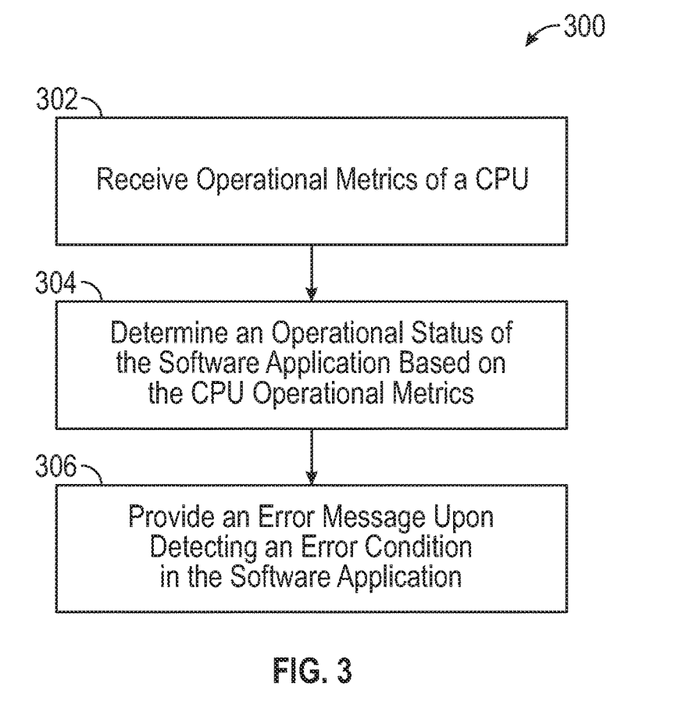
FIG. 3 is a flow diagram of an example hardware-implemented method for debugging software in accordance with some embodiments.

FIG. 3 is a flow diagram of an example hardware-implemented method 300 that includes a debugging or performance optimization algorithm in accordance with some embodiments. The device 102 (FIG. 1), or another device or apparatus can perform one or more operations of example hardware-implemented method 300. According, the device 102 can execute performance monitoring aggregation algorithms in various embodiments to profile applications, as one part of a multi-faceted set of profiling algorithms.

The example method 300 may begin with operation 302 with the device 102 receiving CPU operational metrics, where values of the CPU operational metrics vary with execution of the software application. The CPU operational metrics can include any of the low-level CPU metrics described earlier herein, in addition to any other metrics of the CPU. Receiving can include receiving physical signals including the CPU operational metrics.

The example method 300 may continue with operation 304 with the device 102 determining an operational status of the software application based on the CPU operational metrics. In some examples, the operational status can include a system hang (e.g., where operation halts, but does not crash), memory leak, a "crash" (e.g., where operations halt due to access improper areas of memory) or other status. Upon detecting any error condition, or upon detecting that the software application includes, for example, malicious software, the device 102 can provide (e.g., within a physical signal) one or more error messages to a user operator (e.g., via display 112) or to a second device in operation 306 to indicate an error condition of the software application. The error message/s can be provided responsive to a value of at least one metric of the CPU operational metrics failing to meet a threshold criterion, for example. However, error messages can also be provided responsive to detecting the presence of malicious software, upon detecting a particular value or condition of a CPU operational metric, etc.

The example method 300 can include any other operations or functionalities of a device 102, or usage model thereof, described above with respect to FIGS. 1-3 or elsewhere above. For example, the device 102 can: generate signatures using one of the above-described algorithms for signature generation (or retrieve signatures generated by other systems); and compare stored signatures to runtime signatures to detect malware (e.g., based on comparison of signatures to a signature database of known malware) or to detect non-optimized or badly-performing software in various embodiments.

The device 102 can also recover processor trace data of the software application upon failure of the software application, the processor trace data indicating a previous non-error state of the software application. The device 102 or component thereof can providing instructions to recover the software application to the non-error state based on the processor trace data.

Operations can be performed in any order or in parallel where appropriate. The method 300 can be performed by hardware, firmware, software, or any combination thereof.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more processors of the device 102 may be configured by firmware or software (e.g., instructions 204 (FIG. 2), an application portion, or an application) as a module that operates to perform specified operations. In an example, the software may reside on at least one machine-readable medium. In an example, the software, when executed by the underlying hardware of the module (e.g., the device 102), can include instructions 204 (FIG. 2) to cause the hardware to perform the specified operations.

The term "module" is understood to encompass a tangible entity, be that an entity that is physically constructed, specifically configured (e.g., hardwired), or temporarily (e.g., transitorily) configured (e.g., programmed) to operate in a specified manner or to perform at least pail of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions 204 for execution by a machine (e.g., the device 102 or any other module) and that cause the machine to perform any one or more of the techniques of the present disclosure, or that is capable of storing, encoding or carrying data structures used by or associated with such instructions. In other words, the processing circuitry 202 (FIG. 2) can include instructions and can therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EEPROM)) and flash memory devices; magnetic disks, such as internal hard disks and removable disks; magneto-optical disks: and CD-ROM and DVD-ROM disks.

The instructions 204 may further be transmitted or received over a communications network using a transmission medium utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

The term "transmission medium" shall be taken to include any intangible medium that is capable of storing, encoding or carrying instructions for execution by hardware processing circuitry, and includes digital or analog communications signals or other intangible medium to facilitate communication of such software.

ADDITIONAL NOTES & EXAMPLES

Example 1 includes subject matter (such as a device, computer, processor, compute circuitry, etc.) comprising an interface to a central processing unit (CPU) of a compute node; and processing circuitry coupled to the interface to: during execution of a software application of the CPU, collect CPU operational metrics received over the interface, wherein values of the CPU operational metrics vary with execution of the software application; determine an operational status of the software application based on the values; and provide an output based at least in part on a result of the determination.

In Example 2, the subject matter of Example 1 can optionally include wherein the device is included, within a same chip set as the CPU.

In Example 3, the subject matter of Example 2 can optionally include wherein the device includes a microcontroller to execute Original Equipment Manufacturer (OEM)-provided firmware.

In Example 4 the subject matter of Example 2 can optionally include wherein the device includes a microcontroller to provide at least one of remote configuration, booting from a remote hard drive, providing two-factor authentication, and enabling a poison pill to disable a remote system over a connection.

In Example 5, the subject matter of Example 1 can optionally include wherein the device is electrically coupled to in a separate socket of the compute node from the CPU.

In Example 6, the subject matter of Example 1 can optionally include wherein the CPU operational metrics include L1 cache usage of the CPU.

In Example 7, the subject matter of Example 1 can optionally include wherein the CPU operational metrics include parameters regarding an instruction cache.

In Example 8, the subject matter of Example 1 can optionally include wherein the CPU operational metrics include content of operating system data structures.

In Example 9, the subject matter of Example 1 can optionally include a network interface to communicate to a remote storage, wherein the processing circuitry is to provide the CPU operational metrics to the remote storage.

In Example 10, the subject matter of Example 1 can optionally include wherein the processing circuitry is to further detect that the software application includes malicious software based on a previously-stored signature of the software application.

In Example 11, the subject matter of Example 1 can optionally include memory to store the CPU operational metrics.

In Example 12, the subject matter of Example 1 can optionally include wherein the processing circuitry is to process the CPU operational metrics during execution of the software application to determine the operational status of the software application.

In Example 13, the subject matter of Example 1 can optionally include wherein the processing circuitry is to provide an indicator of an error condition of the software application, responsive to at least one of the values failing to meet a threshold criterion.

In Example 14, a machine-readable storage medium stores instructions for execution by a machine (e.g., computer, processor, network node, etc.) to cause the machine to perform operations including: during execution of a software application of a CPU separate from the machine, receive CPU operational metrics, values of the CPU operational metrics varying with execution of the software application; determine an operational status of the software application based on the values; and provide an indication of an error condition of the software application, responsive to at least one of the values failing to meet a threshold criterion.

In Example 15, the subject matter of Example 14 can optionally include wherein the machine is collocated with the CPU within a chip set.

In Example 16, the subject matter of Example 14 can optionally include wherein the machine is electrically coupled to a separate socket of a compute node that includes the CPU.

In Example 17, the subject matter of Example 14 can optionally include wherein the instructions configure the machine to perform operations including: providing the CPU operational metrics to a remote storage.

In Example 18, the subject matter of Example 14 can optionally include wherein the instructions configure the machine to perform operations including: retrieving a signature of the software application from memory; and determining that the software application includes malicious software based on the signature.

In Example 19, the subject matter of Example 14 can optionally include wherein the instructions configure the machine to process the CPU operational metrics during execution of the software application to determine the operational status of the software application.

In Example 20, the subject matter of Example 14 can optionally include wherein the instructions configure the machine to provide an indicator of an error condition of the software application, responsive to at least one of the values failing to meet a threshold criterion.

In Example 21, a method can be performed by a device (e.g., computer, processor, network node, etc.) for debugging a software application executing on a central processing unit (CPU) remote from the device. The method can include: during execution of the software application, receiving CPU operational metrics, values of the CPU operational metrics varying with execution of the software application; determining an operational status of the software application based on the values; and providing an indication of an error condition of the software application, responsive to at least one of the values failing to meet a threshold criterion.

In Example 22, the subject matter of Example 21 can optionally include wherein the CPU operational metrics include L1 cache usage of the CPU.

In Example 23, the subject matter of Example 22 can optionally include wherein the CPU operational metrics include L2 cache usage of the CPU.

In Example 24, the subject matter of Example 21 can optionally include detecting that the software application includes malicious software based on a previously-stored signature of the software application.

In Example 25, the subject matter of Example 21 can optionally include recovering processor trace data of the software application upon failed execution of the software application, the processor trace data indicating a previous non-error state of the software application; and providing instructions to recover the software application to the previous non-error state based on the processor trace data.

In Example 26, an apparatus (e.g., computer or circuitry thereof) can include means to receive central processing unit (CPU) operational metrics during execution of a software application of the CPU, values of the CPU operational metrics varying with execution of the software application; and means to determine an operational status of the software application based on the values.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated verbatim. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A device comprising:
   an interface to a central processing unit (CPU) of a compute node; and
   processing circuitry coupled to the interface to:
      during execution of a software application of the CPU, collect CPU operational metrics received over the interface, wherein values of the CPU operational metrics vary with execution of the software application;
      determine an operational status of the software application based on the values; and
      provide an output based at, least, in part on a result of the determination,
   wherein the device is included within a same chip set as the CPU.

2. The device of claim 1, wherein the device includes a microcontroller to execute Original Equipment Manufacturer (OEM)-provided firmware.

3. The device of claim 1, wherein the device includes a microcontroller to provide at least one of remote configuration, booting from a remote hard drive, providing two-factor authentication, and enabling a poison pill to disable a remote system over a connection.

4. The device of claim 1, wherein the device is electrically coupled to in a separate socket of the compute node from the CPU.

5. The device of claim 1, wherein the CPU operational retries include L1 cache usage of the CPU.

6. The device of claim 1, wherein the CPU operational metrics include parameters regarding an instruction cache.

7. The device of claim 1, wherein the CPU operational metrics include content of operating system data structures.

8. The device of claim 1, further comprising:
a network interface to communicate to a remote storage, wherein the processing circuitry is to provide the CPU operational metrics to the remote storage.

9. The device of claim 1, wherein the processing circuitry is to further detect that the software application includes malicious software based on a previously-stored signature of the software application.

10. The device of claim 1, further comprising memory to store the CPU operational metrics.

11. The device of claim 1, wherein the processing circuitry is to process the CPU operational metrics during execution of the software application to determine the operational status of the software application.

12. The device of claim 1, wherein the processing circuitry is to provide an indicator of an error condition of the software application, responsive to at least one of the values failing to meet a threshold criterion.

13. A non-transitory machine-readable medium including instructions that, when executed on a machine cause the machine to perform operations including:
during execution of a software application of a CPU separate from the machine, receive CPU operational metrics, values of the CPU operational metrics varying with execution of the software application;
determine an operational status of the software application based on values; and
provide an output based at least in part on a result of the determination,
wherein the machine is collocated with the CPU within a chip set.

14. The non-transitory machine-readable medium of claim 13, wherein the machine is electrically coupled to a separate socket of a compute node that includes the CPU.

15. The non-transitory machine-readable medium of claim 13 wherein the instructions configure the machine to perform operations including:
providing the CPU operational metrics to a remote storage.

16. The non-transitory machine-readable medium of claim 13 wherein the instructions configure the machine to perform operations including:
retrieving a signature of the software application from memory; and
determining that the software application includes malicious software based on the signature.

17. A method, performed by a device, for debugging a software application executing on a central processing unit (CPU) remote from the device, the method comprising:
during execution of the software application, receiving CPU operational metrics, values of the CPU operational metrics varying with execution of the software application;
determining an operational status of the software application based on the values; and
providing an output based at least in part on a result of the determining,
wherein the device is included within a same chip set as the CPU.

18. The method of claim 17, wherein the CPU operational metrics include L1 cache usage of the CPU.

19. The method of claim 18, wherein the CPU operational metrics include L2 cache usage of the CPU.

20. The method of claim 17, further comprising:
detecting that the software application includes malicious software based on a previously-stored signature of the software application.

21. The method of claim 17, further comprising:
recovering processor trace data of the software application upon failed execution of the software application, the processor trace data indicating a previous non-error state of the software application; and
providing instructions to recover the software application to the previous non-error state based on the processor trace data.

22. An apparatus comprising:
means to receive central processing unit (CPU) operational metrics during execution of a software application of the CPU, values of the CPU operational metrics varying with execution of the software application; and
means to determine an operational status of the software application based on the values,
wherein the apparatus is included within a same chip set as the CPU.

* * * * *